(12) United States Patent
Itoh

(10) Patent No.: US 6,419,369 B1
(45) Date of Patent: Jul. 16, 2002

(54) SHEET-LIKE SOURCE LIGHT DEVICE AND LIQUID CRYSTAL DISPLAY DEVICE USING THE SAME

(75) Inventor: Atsushi Itoh, Kumamoto (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/685,039

(22) Filed: Oct. 10, 2000

(30) Foreign Application Priority Data

Oct. 26, 1999 (JP) .......................................... 11-303349

(51) Int. Cl.[7] ................................................ F21V 7/04
(52) U.S. Cl. ........................................... 362/26; 362/31
(58) Field of Search ............................ 362/26, 31, 551, 362/225, 217

(56) References Cited

U.S. PATENT DOCUMENTS

| | | | | |
|---|---|---|---|---|
| 6,064,455 A | * | 5/2000 | Kim ........................... | 349/113 |
| 6,074,070 A | * | 6/2000 | Sasako ........................ | 362/31 |
| 6,219,117 B1 | * | 4/2001 | Nagakubo et al. ............ | 349/65 |
| 6,295,105 B1 | * | 9/2001 | Lee et al. ..................... | 349/65 |

* cited by examiner

Primary Examiner—Sandra O'Shea
Assistant Examiner—Jacob Y. Choi
(74) Attorney, Agent, or Firm—Oblon, Spivak, McClelland, Maier & Neustadt, P.C.

(57) ABSTRACT

A sheet-like light source device includes a light-conducting plate, at least one rod-like light source arranged to be adjacent to a light incidence surface, a tubular reflecting member covering the rod-like light source, a planar reflecting member disposed proximate to a position facing a lower surface of the light-conducting plate, and a holding member housing the light-conducting plate, the light source and both of the reflecting members. A stepped portion is provided on the holding member to contact a part of a side of the light-conducting plate on which the rod-like light source is arranged, with the holding member. A distance between the light-conducting plate and the holding member on the stepped portion is made narrower than a distance between an opening portion of the tubular reflecting member and the light-conducting plate. It is possible to obtain a sheet-like light source device which can ensure high impact resistance even if the device is large in size, which can be manufactured at a low cost and which can suppress the occurrence of uneven brightness.

6 Claims, 5 Drawing Sheets

SHEET-LIKE SOURCE LIGHT DEVICE AND LIQUID CRYSTAL DISPLAY DEVICE USING THE SAME

BACKGROUND OF THE INVENTION

1. Field of the Invention

The present invention relates to a sheet-like light source device and a liquid crystal display device using the sheet-like light source device. More particularly, it relates to a sheet-like light source device which is employed as a backlight of a liquid crystal display device, which has high impact resistance and can be manufactured at a low cost even if the device is large in size, and which can suppress the occurrence of uneven brightness, and a liquid crystal display device using the surface light source device.

2. Discussion of the Background

In a liquid crystal display device, a backlight is employed to apply light onto a liquid crystal display element. As shown in FIGS. 4 to 5, a conventional backlight has a reflecting plate 4 arranged to face a light reflecting surface 3b of a flat light-conducting plate 3 and an optical sheet 6 arranged on the light emission surface 3c opposed to the light reflecting surface 3b. A light source (lamp) 1 is provided along the light incidence surface 3a of the light-conducting plate 3, and a reflecting member (reflector) 2 is arranged around the light source 1 so as to allow light from the light source 1 to be efficiently incident on the light-conducting plate 3. In many cases, a fluorescent tube is employed as the light source 1. One or a plurality of fluorescent tubes are arranged relative to one side surface of the light-conducting plate 3. The light sources 1 are sometimes arranged on a plurality of sides of the light-conducting plate 3, respectively. The optical sheet 6 is, for example, a plurality of prism sheets arranged to converge light in the direction of the angle of visibility of the liquid crystal display element 7. As shown in FIG. 4, the light source 1, reflecting member 2, light-conducting plate 3 and reflecting member (reflector) 2 are held by a holding member (frame) 5. This holding member 5 also forms a gap between the liquid crystal display element 7 and the light-conducting plate 3 so as to prevent excessive pressure from being applied onto the optical sheet 6. With the conventional structure, an optical structure cannot be formed on the side surface of the light-conducting plate 3 facing the light source 1, and the position of the light-conducting plate 3 cannot be, therefore, fixed using the side surface facing the light source 1. Due to this fact, as shown in FIG. 5, a protrusion 3d or a recess is formed on a side surface which does not face the light source 1 to thereby hold the position of the light-conducting plate 3. A structure to be fitted into this protrusion 3d is formed on the holding member 5. By fitting the structure into the protrusion 3d, the light-conducting plate 3 is fixed.

However, due to formation of the protrusion 3d for fixing to the light-conducting plate 3, the following problems occur: (1) Force concentrates on the protrusion 3d when impact load is applied. If the surface light source device is larger in size, in particular, the weight of the light-conducting plate increases and the light-conducting plate cannot resist the impact load, thereby causing a crack. (2) Due to the optical structure provided on the side surface of the light-conducting plate 3, abnormal light emission derived from the optical structure occurs. (3) The formation of the protrusion 3d pushes up the unit price of the light-conducting plate or the cost of a die for forming it. (4) The light source 1 cannot be arranged on the side surface having the protrusion 3d. (5) If the light-conducting plate 3 has a prism function, abnormal light emission due to the protrusion 3d widely occurs on the surface.

The present invention has been made to solve the above-mentioned problems. It is an object of the present invention to provide a sheet-like light source device and a liquid crystal display device using the sheet-like light source device which can ensure high impact resistance even if the sheet-like light source device is large in size, which can be manufactured at a low cost and which can suppress the occurrence of uneven brightness.

SUMMARY OF THE INVENTION

In accordance with the present invention, there is provided a sheet-like light source device of side-light type comprising a light-conducting plate made of transparent material; at least one rod-like light source arranged to be adjacent to a light incidence surface which is at least one side of the light-conducting plate, a tubular reflecting member covering portions of the rod-like light source other than a surface facing the light-conducting plate, a planar reflecting member disposed proximate to a position facing a lower surface of the light-conducting plate, and a holding member housing the light-conducting plate, the light source and both of the reflecting members, wherein a stepped portion is provided on the holding member to contact a part of a side of the light-conducting plate on which the rod-like light source is arranged, with the holding member for holding the light-conducting plate, and a distance between the light-conducting plate and the holding member on the stepped portion is made narrower than a distance between an opening portion of the tubular reflecting member and the light-conducting plate.

Further, a liquid crystal display device according to the resent invention is characterized by disposing a liquid crystal display element on the sheet-like light source device.

DESCRIPTION OF THE PREFERRED EMBODIMENT

A sheet-like light source device and a liquid crystal display device using the sheet-like light source device according to the present invention will be described in more detail hereinafter with reference to the drawings.

Figure 1:
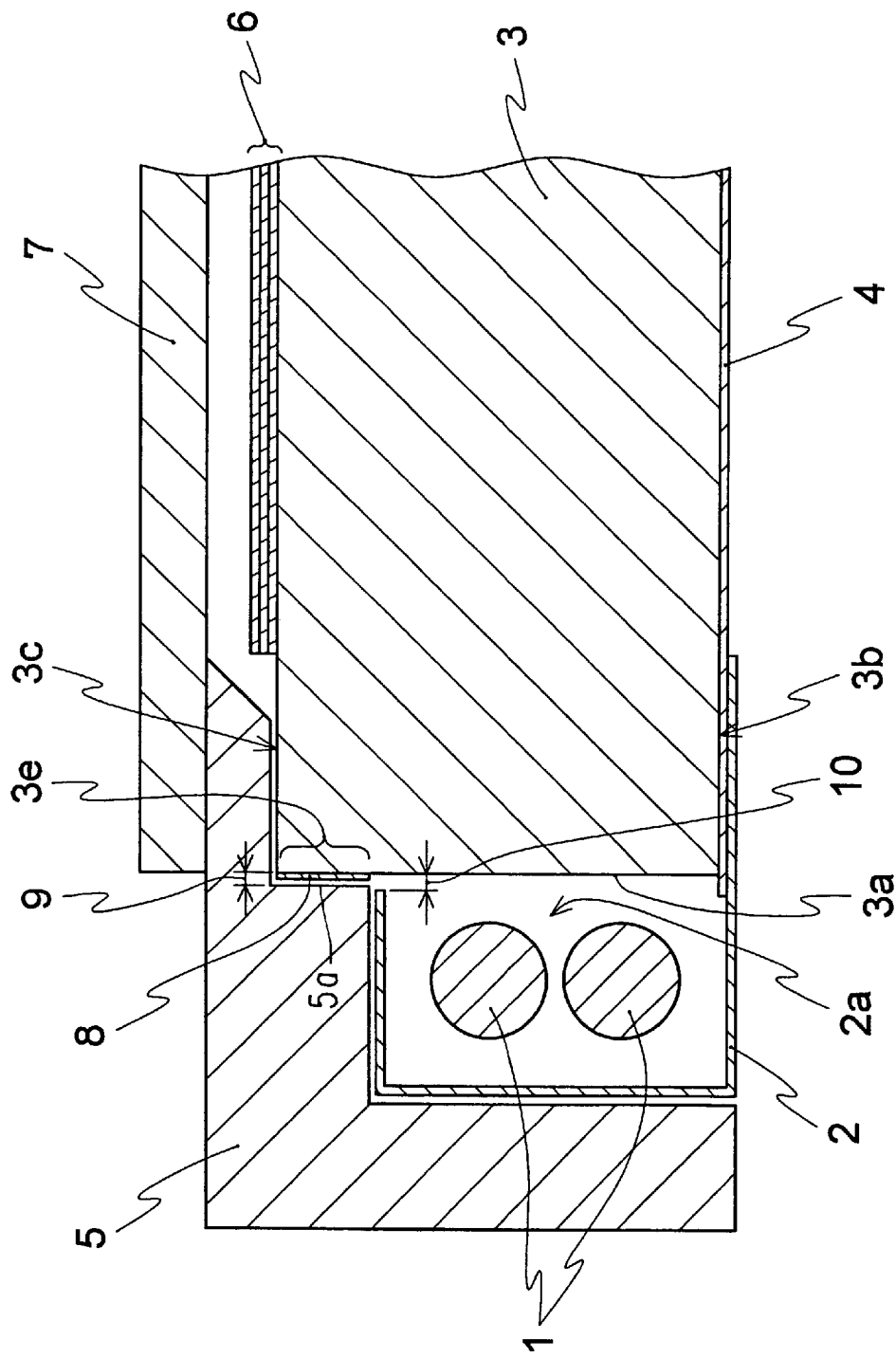
FIG. 1 is a cross-sectional view showing one embodiment of a sheet-like light-source device according to the present invention.
Figure 2:
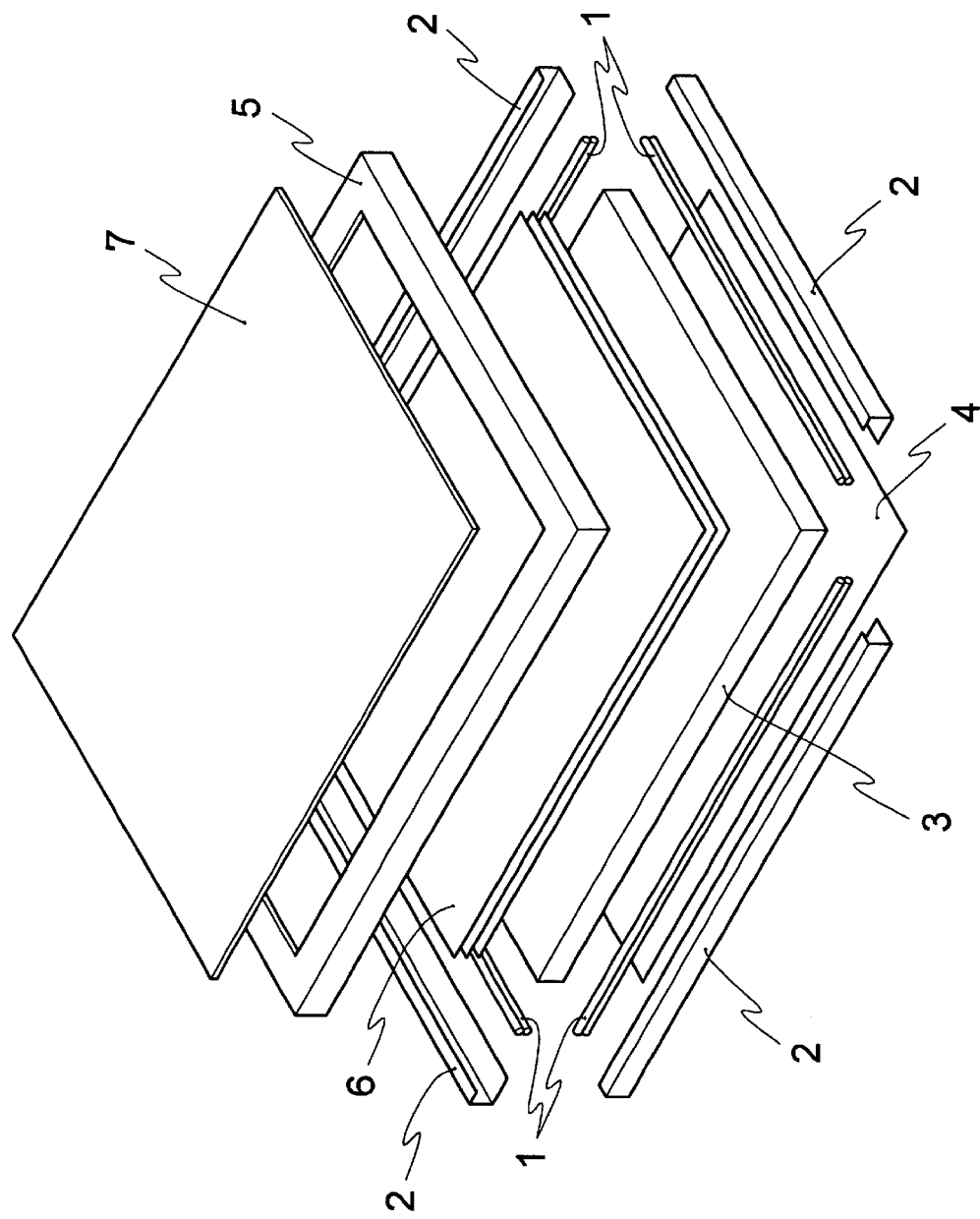
FIG. 2 is an exploded perspective, explanatory view of FIG. 1.
Figure 3:
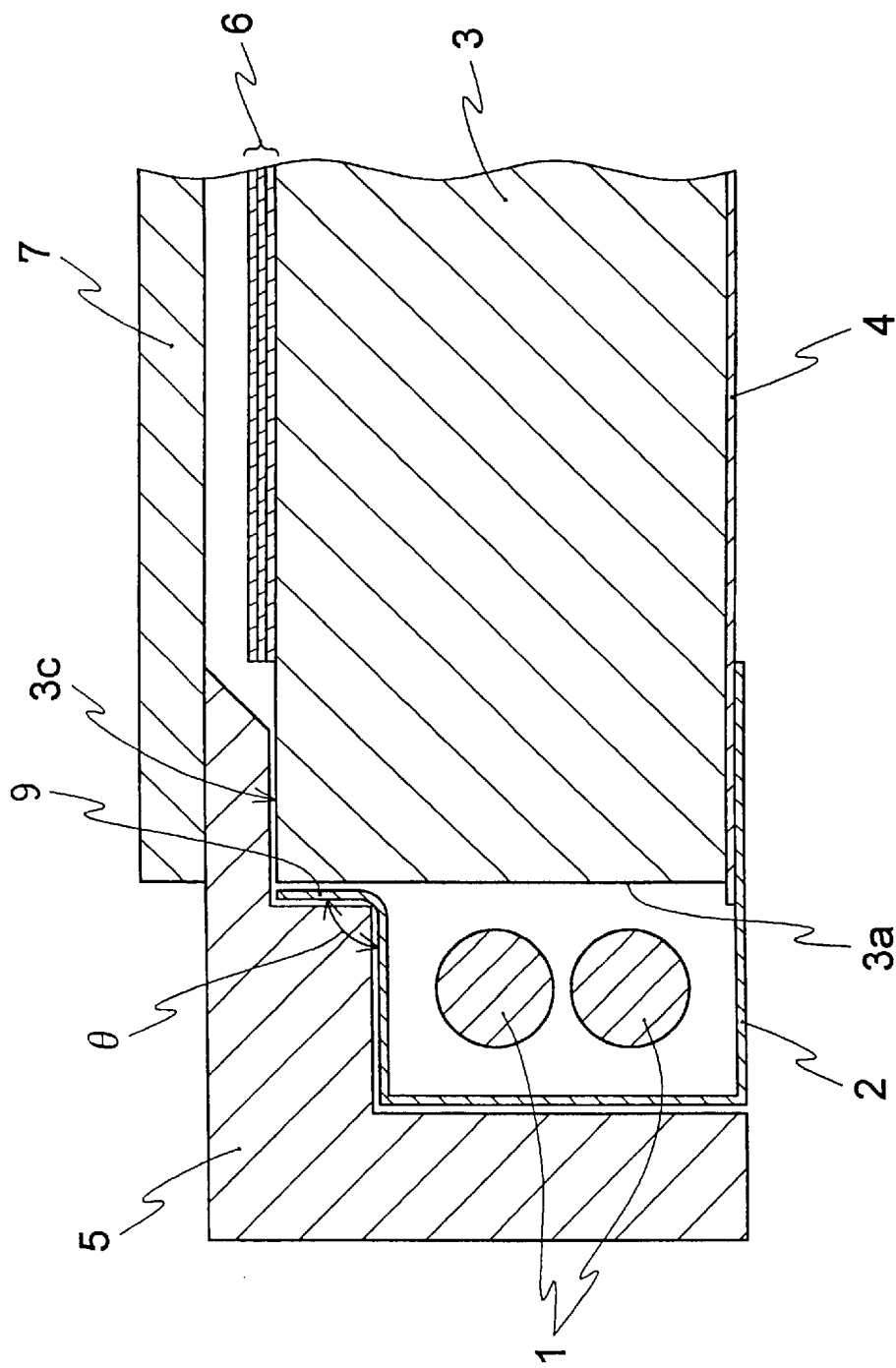
FIG. 3 is a cross-sectional view showing another embodiment of the sheet-like light source device according to the present invention.
Figure 4:
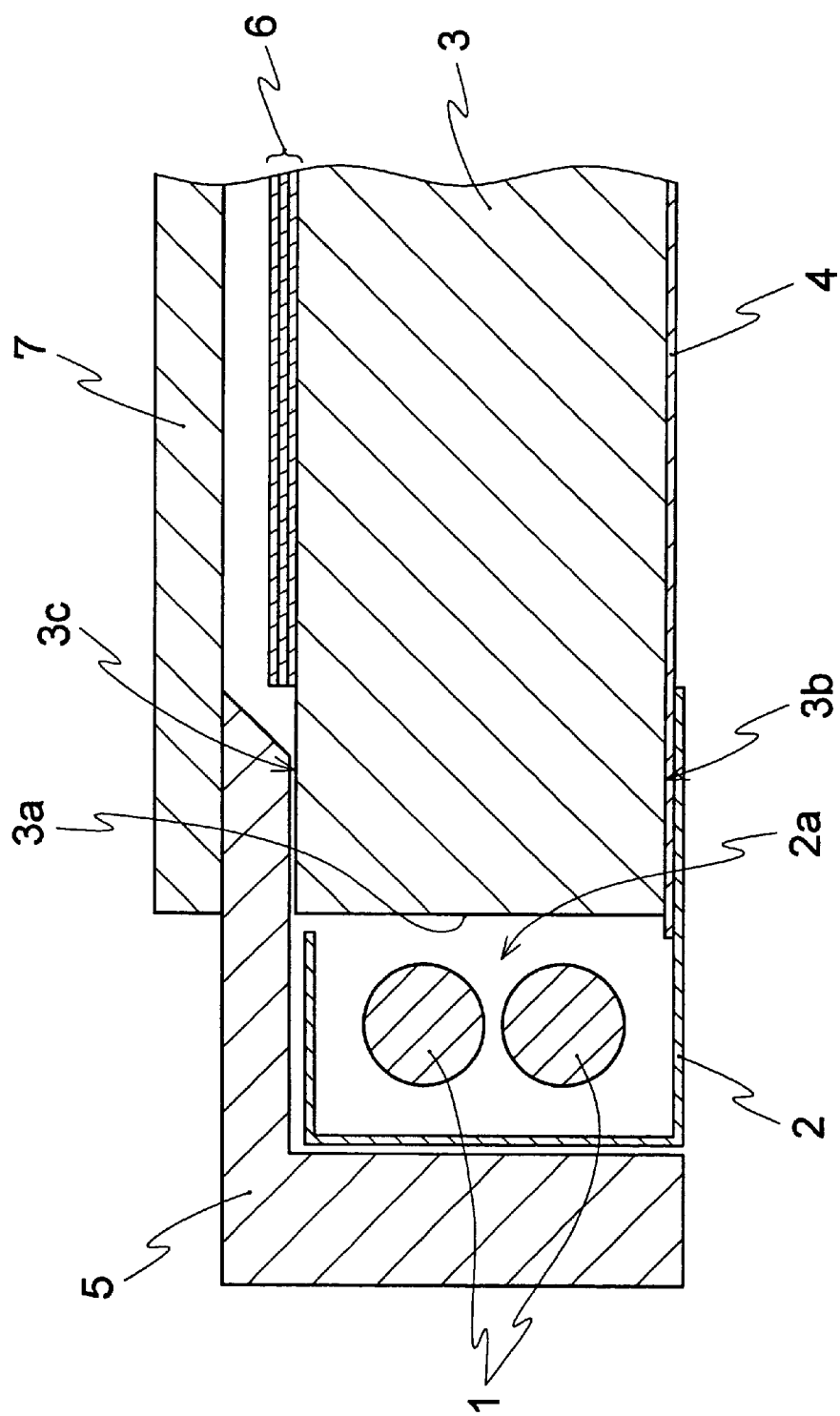
FIG. 4 is a cross-sectional view of a conventional backlight.
Figure 5:
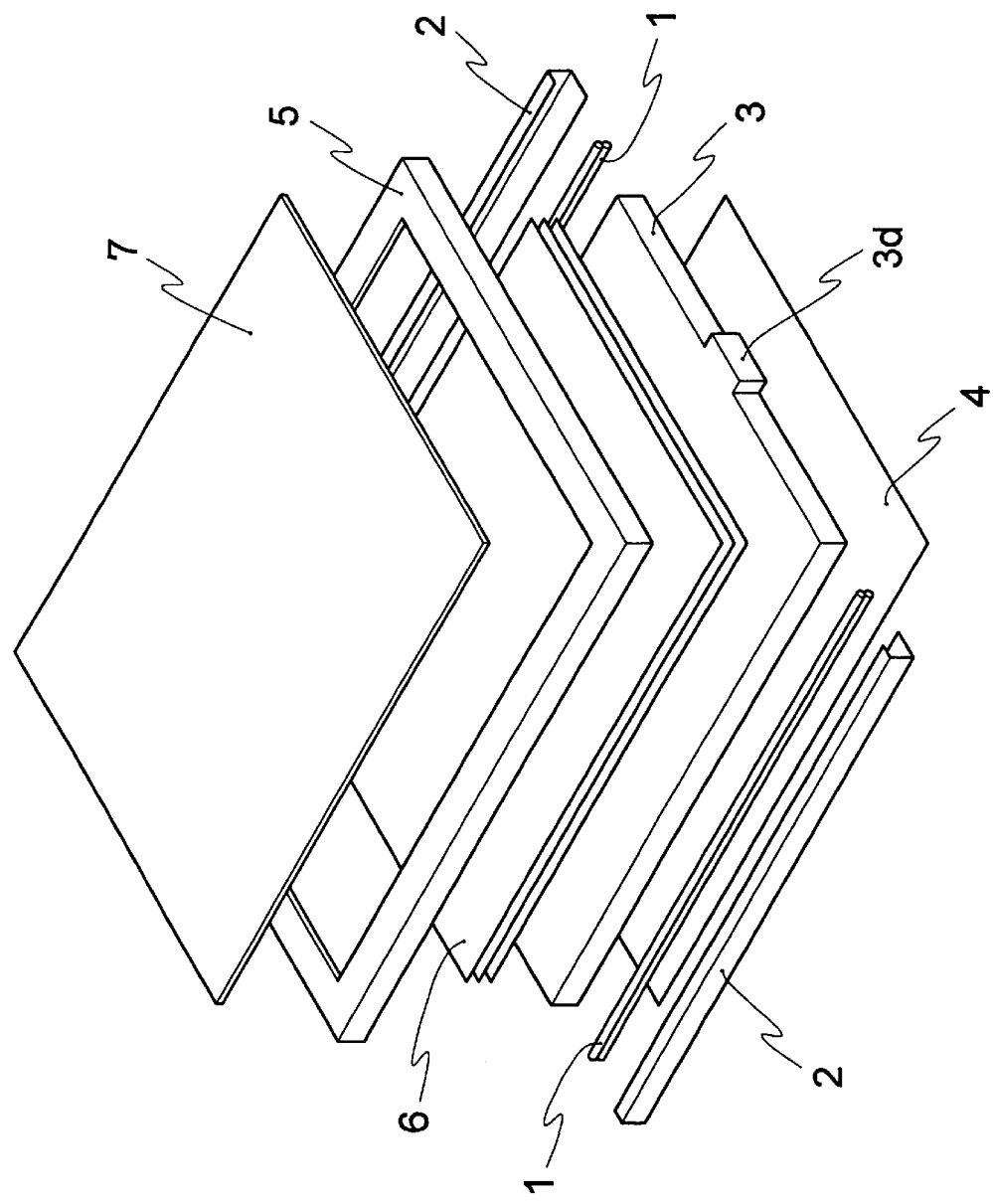
FIG. 5 is an exploded perspective view of the conventional backlight.

FIG. 1 is a cross-sectional view showing one embodiment of the present invention and FIG. 2 is an exploded perspective view thereof. As shown in FIGS. 1 and 2, the sheet-like light source device is of side-light type and comprises a light-conducting plate 3 made of transparent material, rod-like light sources 1 arranged to be adjacent to light incidence surfaces which are sides of the light-conducting plate 3, longitudinally extending reflecting members 2 covering portions of the rod-like light sources 1 other than surfaces facing the light-conducting plate 3, a planar reflecting member 4 disposed proximate to a position facing a lower surface of the light-conducting plate 3, and a holding member 5 housing the light-conducting plate, the light sources and both of the reflecting members 2 and 4. By disposing a liquid crystal display element 7 on this sheet-like light source device, a liquid crystal display device can be obtained.

The light-conducting plate 3 has side surfaces which constitute the light incidence surfaces 3a and is made of transparent material with a high light transmittance such as polymethyl methacrylate (PMMA), polycarbonate (PC) or glass. In this embodiment, a PMMA flat plate of 10 mm in thickness is employed. Further, to prevent light leakage, there is arranged the reflecting member 4 made of, for example, a white polyester film to face the rear surface of the light-conducting plate 3. In this embodiment, a reflecting member of 0.2 mm in thickness is employed. This reflecting member 4 is provided even into the reflecting members 2 beyond the light incidence surfaces 3a of the light-conducting plate 3. The light sources 1 apply light onto the light-conducting plate 3 and each consists of a cold-cathode fluoresent tube (CCFL). In this embodiment, two light sources are employed per side of the light guide member 3. The reflecting members 2 surround the light sources 1, respectively. Each of the members 2 has an opening portion 2a toward the light incidence surface 3a of the light-conducting plate 3 and reflects and guides light from the corresponding light source to the light-conducting plate 3. A silver deposited film is bonded onto the reflecting surface of the reflecting member 2 to provide high light reflectance. In this embodiment, the dimension of the opening portion 2a is 8.2 mm.

In this embodiment, there is a difference in dimension between the light incidence surface 3a of the light-conducting plate 3 and the opening portion 2a of the reflecting member 2 by almost 2 mm, and a partial surface on the side surface of the light-conducting plate 3 denoted by reference symbol 3e in FIG. 1 is, therefore, exposed. By forming a stepped portion on the holding member 5 at a position facing each partial side surface 3e and arranging the holding member 5 to be adjacent to the partial side surface 3e, the light-conducting plate 3 can be held without providing the light-conducting plate 3 with a protrusion. In this embodiment, the light source 1 can be arranged even at a position at which the light source cannot be conventionally arranged as shown in FIG. 2, by employing a structure in which the light-conducting plate 3 does not have a protrusion. In addition, conventionally, forces concentrate on the protrusion of the light-conducting plate when an impact load is applied and a crack occurs to the light-conducting plate. According to the present invention, by contrast, it is possible to receive such load on the entire side surfaces of the light-conducting plate, thereby making it possible to greatly improving the impact resistance of the light-conducting plate. Besides, if the protrusion of the light-conducting plate is damaged due to impact, the conventional light source device cannot restrict the movement of the light-conducting plate when further impact is applied to the plate, so that the light-conducting plate might sometimes contact with and damage the light source. In this embodiment, however, due to the structure of receiving the load on the entire holding member 5, the light-conducting plate 3 does not contact with the light sources 1. Further, by making the distance 9 between the partial surface 3e of the light-conducting plate 3 and, the holding member 5 narrower than the distance 10 between the opening end portion of the opening portion 2a of the reflecting member 2 and the light incidence surface 3a of the light-conducting plate 3, the side surface of the opening portion 2a of the reflecting member 2 does not contact with the light-conducting plate 3. With the arrangement, the sheet-like light source device for allowing replacement of the reflecting members 2, in particular, is free from a problem of chipping the light-conducting plate 3 when the reflecting member 2 is drawn out or arranged. Further, in this embodiment, abnormal light emission resulting from the protrusion of the light-conducting plate does not occur, either. Thus, even with a light-conducting plate having a prism function, it is possible to ensure uniform display while not causing uneven brightness without the need to take special measures for uniform display. In addition, since the light-conducting plate does not have a peculiar structure such as a protrusion, the plate can be manufactured at a low cost. On the other hand, however, due to a structure in which the reflecting member is not arranged on the partial side surface 3e of the light-conducting plate 3, there is a fear of a decrease in brightness. If the holding member 5 is black, in particular, the decreased brightness becomes more conspicuous. By bonding a white side reflecting material 8 onto the partial surface 3e of the light-conducting plate 3, this problem can be solved. In this embodiment, therefore, the decrease of brightness does not occur so as to thereby make it possible to obtain a uniform light source. Moreover, according to the conventional light source device, due to the existence of the protrusion or the like on the light-conducting plate, the light sources are arranged on limited number of sides, i.e., at most two sides. If many light sources are employed to obtain high brightness, the number of light sources per side inevitably increases. As a result, a sheet-like light source with a high brightness has a drawback that the light-conducting plate is thickened. In this embodiment, by contrast, it is possible to arrange light sources on all sides of the light-conducting plate. Thus, even if the light-conducting plate employed is as thick as the light-conducting plate employed in the conventional light source device, it is possible to double the number of light sources. Likewise, there is proposed a vertical-type sheet-like light source device having many light sources arranged right under a liquid crystal display element without using a light-conducting plate so as to obtain high brightness. In this case, the thickness of the device disadvantageously increases like in the case of the conventional sheet-like light source device. In this embodiment, by contrast, it is possible to reduce the thickness of the device compared with the number of the light sources.

In this embodiment, the light-conducting plate 3 is made to face the holding member 5 at the side surface on the light emission surface 3c side. The light-conducting plate 3 can face a frame at the side surface on the reflecting surface 3b side. If necessary, the light-conducting plate 3 might face the holding member on both the light emission surface 3c side and the light reflecting surface 3b side.

Further, while the light sources 1 are arranged on four side surfaces of the light-conducting plate 3, respectively in this embodiment, it suffices to arrange the light sources 1 on at least one side surface.

While the flat light-conducting plate 3 is employed in this embodiment, a wedge-like light-conducting plate frequently used in. a thin sheet-like light source device might be employed.

In this embodiment, with a view to preventing the decrease of brightness, the reflecting material 8 is bonded onto the light-conducting plate 3. The reflecting material 8 might be bonded onto the holding member 5. Alternatively, high reflectance paint might be directly coated on either the light-conducting plate 3 or the holding member 5. It is possible to omit either the side reflecting member or the paint as long as sufficient brightness is ensured.

In this embodiment, the angle at which light is emitted to the liquid crystal display element is controlled by providing the optical sheet. However, the optical sheet can be omitted.

In this embodiment, the side reflecting member 8 is bonded onto the light-conducting plate 3. The reflecting surface of a bent portion 9 formed by bending the upper portion of the reflecting member 2 might be directed toward the light incidence surface 3*a* of the light-conducting plate 3. In that case, if a rise angle $\theta$ of the reflecting member 2 is set at not less than right angle, it is possible to prevent light from spreading into the light emission surface 3*c*.

As described so far, according to the present invention, it is possible to obtain a sheet-like light source device which can ensure high impact resistance even if the device is large in size, which can be manufactured at a low cost and which can suppress the occurrence of uneven brightness.

Moreover, it is possible to obtain a device including the above advantages by employing the present invention as the backlight for a liquid crystal display device.

What is claimed is:

1. A sheet-like light source device comprising a light-conducting plate made of transparent material; at least one rod-like light source arranged to be adjacent to a light incidence surface which is at least one side of the light-conducting plate, a longitudinally extending reflecting member covering portions of the rod-like light source other than a surface facing the light-conducting plate, a planar reflecting member disposed proximate to a position facing a lower surface of the light-conducting plate, and a holding member housing the light-conducting plate, the light source and each of said reflecting members, wherein a stepped portion is provided on the holding member to contact a part of a side of the light-conducting plate on which the rod-like light source is arranged, with the holding member for holding the light-conducting plate, and a distance between the light-conducting plate and the holding member on the stepped portion is made narrower than a distance between an opening portion of the reflecting member and the light-conducting plate.

2. The sheet-like light source device of claim 1, wherein further including means for reflecting light, the means being provided between the light-conducting plate and the holding member at the stepped portion.

3. The sheet-like light source device of claim 2, wherein the means for reflecting light comprises one of a reflecting member and paint.

4. The sheet-like light source device of claim 2, wherein the means for reflecting light comprises a bent portion formed by bending a part of a reflecting surface of the reflecting member so as to be opposed to a side of the light-conducting plate.

5. The sheet-like light device of any one of claims 1 to 4, wherein the rod-like light source is arranged at a plurality of sides of the light-conducting plate.

6. A liquid crystal display device in which a liquid crystal display element is mounted on a sheet-like light source device, the sheet-like light source device comprising a light-conducting plate made of transparent material; at least one rod-like light source arranged to be adjacent to a light incidence surface which comprises at least one side of the light-conducting plate, a longitudinally extending reflecting member covering portions of the rod-like light source other than a surface facing the light-conducting plate, a planar reflecting member disposed proximate to a position facing a lower surface of the light-conducting plate, and a holding member housing the light-conducting plate, the light source and both of the reflecting members, wherein a stepped portion is provided on the holding member to contact a part of a side surface of the light-conducting plate on which the rod-like light source is arranged, with the holding member for holding the light-conducting plate, and a distance between the light-conducting plate and the holding member on the stepped portion is made narrower than a distance between an opening portion of the effecting member and the light-conducting plate.

\* \* \* \* \*

UNITED STATES PATENT AND TRADEMARK OFFICE
CERTIFICATE OF CORRECTION

PATENT NO.    : 6,419,369 B1
DATED         : July 16, 2002
INVENTOR(S)   : Itoh

It is certified that error appears in the above-identified patent and that said Letters Patent is hereby corrected as shown below:

<u>Title page, Item [54] and Column 1, lines 1-3,</u>
Should read:

-- SHEET-LIKE LIGHT SOURCE DEVICE AND LIQUID CRYSTAL DISPLAY DEVICE USING THE SAME --

Signed and Sealed this

Twenty-first Day of January, 2003

JAMES E. ROGAN
*Director of the United States Patent and Trademark Office*